June 23, 1936.  L. W. JOYCE  2,045,188
ASSEMBLING MACHINE FOR STITCHING TOGETHER FABRIC PIECES
Filed Aug. 10, 1931  12 Sheets-Sheet 1

Fig.1.

Inventor
*L. W. Joyce*
By *Mason Fenwick & Lawrence*
Attorneys

June 23, 1936. L. W. JOYCE 2,045,188
ASSEMBLING MACHINE FOR STITCHING TOGETHER FABRIC PIECES
Filed Aug. 10, 1931 12 Sheets-Sheet 3

Inventor
L. W. Joyce
By Mason Fenwick & Lawrence
Attorneys

Inventor
L. W. Joyce

June 23, 1936.  L. W. JOYCE  2,045,188
ASSEMBLING MACHINE FOR STITCHING TOGETHER FABRIC PIECES
Filed Aug. 10, 1931   12 Sheets-Sheet 7

Inventor
L. W. Joyce
By Mason Fenwick & Lawrence
Attorneys

June 23, 1936. L. W. JOYCE 2,045,188
ASSEMBLING MACHINE FOR STITCHING TOGETHER FABRIC PIECES
Filed Aug. 10, 1931 12 Sheets-Sheet 10

Inventor
L. W. Joyce
By Mason Fenwick Lawrence
Attorneys

June 23, 1936.　　　　L. W. JOYCE　　　　2,045,188
ASSEMBLING MACHINE FOR STITCHING TOGETHER FABRIC PIECES
Filed Aug. 10, 1931　　　12 Sheets-Sheet 11

Inventor
L. W. Joyce
By Mason Fenwick & Lawrence
Attorneys

June 23, 1936.                L. W. JOYCE                 2,045,188
         ASSEMBLING MACHINE FOR STITCHING TOGETHER FABRIC PIECES
                Filed Aug. 10, 1931         12 Sheets—Sheet 12

Inventor
L. W. Joyce
By Mason Fenwick Lawrence
Attorneys

Patented June 23, 1936

2,045,188

UNITED STATES PATENT OFFICE 2,045,188

ASSEMBLING MACHINE FOR STITCHING TOGETHER FABRIC PIECES

Lyndon W. Joyce, Greensboro, N. C.

Application August 10, 1931, Serial No. 556,246

13 Claims. (Cl. 112—2)

This invention relates to machines for automatically bringing fabric pieces together at a sewing place and sewing them together. Its chief use as contemplated at the present time is for the sewing of elastic portions to inelastic portions of suspenders or shoulder straps for overalls. It is of course adapted to other uses.

One of the objects of the invention is to provide means for feeding fabric inserts, one at a time successively from a magazine to the sewing point and removing them successively after the necessary sewing operation has been completed.

A further object of the invention is the provision of means for feeding together at a common sewing point fabric blanks from separate sources, sewing them together and successively removing them.

Another object of the invention is to provide a machine for feeding together fabric blanks to a common sewing point and then sewing them together, the blanks being supplied, on the one hand, from a magazine, and on the other hand, from a roll of fabric from which the blanks are cut synchronously with the feeding of the same.

Still another object of the invention is to provide for feeding together a flat blank and a tubular blank, both of fabric, so that the end of one telescopes into the end of the other at the sewing place.

Other objects of the invention will appear as the following description of a preferred and practical embodiment thereof proceeds.

In the drawings throughout the several figures, of which the same reference characters have been used to designate identical parts.

Referring now in detail to the several figures, the numeral 1 represents a base or support which may be of any desired construction, but is here shown as including four legs, a frame forming a top platform 2, an intermediate frame 3 and a lower frame 4. A sewing machine head 5 of known construction is supported on the upper platform 2 and insofar as the performance of its functions as a sewing machine is concerned, it is not per se, a part of the present invention, but only where it combines with the novel instrumentalities which will presently be described. Suffice it to say that in the present illustrative embodiment of the invention, the sewing machine is of that type in which the needle oscillates transversely of the direction in which the fabric is moved, and consequently, the presser foot 6 is formed with a relatively wide elongated eye 7.

The platform 2 is provided with pairs of spaced track members 8 and 9 arranged transversely with respect to the direction in which the fabric is moved by the feed mechanism of the sewing machine and in alignment generally with each other and with the sewing needle.

Referring to the track on the left hand side of the machine, it is formed on its inner side with grooves forming guides for the outer member 10 of a feeder. This outer member comprises a pair of side bars 11 and 12 joined rearwardly by an end bar 13. The inner faces of the side bars 11 and 12 are grooved forming a guide for the inner member 14 of the feeder. Said inner member is rigidly secured with respect to a lug 15 by means of which the inner feeder member is reciprocated towards and from the point of sewing in the operation of the machine. The forward end of the inner feeder member rounds downwardly as shown at 16 and this edge is made inclined for a purpose that will presently appear. The inner feeder member has side flanges 17 giving it the form of a trough of substantially the width of the fabric blank which it is to deliver to the place of sewing. The outer feeder member 10 is formed at its outer ends with slotted lugs 19 in the slots of which are pivotally carried the levers 18, the ends of which are secured to a bar 20 forming the rear portion of the inserting blade 21 which also terminates in an edge and is likewise inclined. The end 16 of the inner feeder member and the inserting blade 21 are provided with a pair of slots 22 registering vertically and designed for the intrusion of the holding needles 23.

The outer and inner feeder members are connected beneath by a spring 24. When the lug 15 moves the inner feeder member forward, it moves alone at first, since the spring holds the outer feeder member back, but when the tension is out of the spring, the two members move together being joined by the rod 25 which the spring encompasses.

A magazine 26 is positioned over the feeder with a space beneath the magazine through which the feeders can slide. The magazine is arranged to receive a pile of uniformly sized fabric units, the lowermost of which rests upon the inner feeder member 14. Said feeder member is provided with a pair of forwardly extending sharp points 27 which project to not quite the thickness of a single one of the fabric units so that there is no danger of more than one being impaled. The front of the magazine is provided with a slot 28 sufficiently high to permit the impaled blank to emerge from the magazine with the feeder upon the forward movement of the latter. Since the fabric blanks may be of different thickness, it is desirable to vary the height of the slot 28, which variation is accomplished by means of the gate 29 having a vertical slot 30 through which extends a screw 31 by means of which the gate is adjustably secured at the proper height.

It will be noted that adjacent the front wall of the magazine on each side is a rounded cam 32 against which the bar 20 of the inserting blade abuts upon retrogressive movement of the feeder thereby raising the inserting blade and providing a wide unobstructed opening. This opening persists while the inner member of the feeder recedes still further, impales another blank and draws it out to the point at which it is at or adjacent the forward end of the feeder. When this point has been reached, the tension of the spring 24 will have become fully released so that when the two feeder members now move together as has already been explained, the bar 20 will descend from the cams 32 causing the inserting blade to close down resiliently upon the fabric blank holding it firmly in position up to and during the time of its insertion into the fabric blank to which it is to be stitched.

The pair of track members 9 are formed on their inner faces with grooves 33 slidably guiding a pair of flanges 34 secured at the sides of a flat tube 35. Said tube is flared at its outer end as indicated at 36 for the reception of the end portion of a reel of fabric 37. Said fabric passes over a direction changing roller 38 and is initially introduced through the tube 35 manually. The tube is reciprocated by a lug 39 attached to its under side and actuated by means yet to be described. At the forward end of the tube is fixed a cross bar 40 having a short upright 41 from the front of which projects the lug 42 forming the pivotal connection for a depending latch 43.

The flanges 34 are provided adjacent their outer ends with upstanding lugs 44 in which are pivotally mounted the limbs 45 of a resilient U-shaped frame 45' having a transverse member 46 against which the latch 43 is normally pressed. The frame is normally elevated but when depressed catches in a shoulder 47 of the latch 43 and is held down until released. The frame at its forward end is provided with apertures 48 through which fixed posts 49 project, said posts stabilizing said frame against lateral deflection or distortion. The inner corners of the frame are formed with pairs of small spaced plates 50 to receive the grippers 51 which are slidable in and out. The grippers rise and fall with the frame 45' above and to the level of the fabric blank. Said grippers are mounted on the ends of levers 52 pivotally mounted intermediate their ends in slotted lugs 53 formed on the limbs 45 of the frame 45'. A spring 54 normally holds the grippers inwardly under tension causing the outer ends 55 of the levers 52 to stand away from said limbs. The grippers have teeth 56 which preferably extend vertically downwardly so as to dig into the fabric blank.

Above the track members 9 rises a pair of spaced standards 57, each provided on its inner side with a groove so that the pairs of standards can act as a guide in supporting the vertically sliding block 58. Said block comprises a top portion 59 and end portions 60 and 61. Said portions act as bearings for a shaft 62 which shaft is driven by a pulley 63 connected by a belt 64 to the motor 65. At the outer end of said shaft is a rotating disk knife 66. An arm 67 extends from the slide block 58 and is provided with sockets 68 from which sliding posts 69 project, springs 70 being concealed in said sockets in abutment with the inner ends of said posts giving resiliency to the axial movement of said posts.

The slide block is depressed by means of a rocking lever 71 pivotally supported and pivotally connected at one end to a lug on said sliding block and by a rock lever 72 which eventually extends into operative relation to a cam 73 on the general cam shaft 74 which shaft is supported in bearings 75 on the intermediate frame 3. The operation of the unit will now be described.

It is assumed that the strip of fabric from the reel has been manually introduced through the tube 35 and pulled out to such a distance that it lies inwardly beyond the plane of the disk knife 66. The rock lever, actuated by the cam 73 depresses the sliding block 58 and first causes the posts 69 to make contact with the transverse member 46 and causing it to slip beneath the shoulder of the latch 43, which latch snaps out over the transverse member through the intermediary of the spring 76. This depresses the grippers causing their teeth to dig into the fabric, and they remain thus interengaged with the fabric until the latch is automatically released. The sliding block continues to descend under the actuation of the rock lever until the knife which is constantly rotating engages the fabric and cuts it off transversely.

Upon further operation of the machine the knife starts to rise and as soon as it is above the plane of the fabric, the tube 35 with its appurtenant parts, including the grippers moves forward carrying the fabric toward the needle. When the fabric has reached its ultimate position, the ends 55 of the grippers 51 come into contact with fixed cams 77 and are forced inwardly rocking the levers 52 so as to spread the grippers which being dug into the fabric, stretch it laterally.

In the present embodiment of the invention, the strip of fabric wound upon the reel 37 is tubular, being stitched together with an internal seam on one side. The stretching of the end of this tubular fabric enlarges it to such an extent that the blank carried by the feeder on the opposite side can enter, in slightly telescoped relation into said tubular strip.

When the end of the fabric has reached the region of the sewing needle, the edge-like front of the feeder carrying the blank from the magazine 26 enters into the tubular fabric. At this movement the two holding needles 23 descend through the registering slots in the feeder members and entering through the telescoped portions of the two fabric blanks they hold them in sewing position until the presser foot has substituted itself as a holding means. Also at this time, the depending latch 43 has collided with a stop 78 which pushes it back releasing the transverse member 46 causing the frame 45' to spring up releasing the grippers from their contact with the tubular fabric.

The interengaged pieces of fabric now being firmly held by the holding needles, the feeder on the one hand and the tube 35 on the other hand recede from one another, the cut blank being pulled out of the feeder while the cut off piece of tubular fabric is held, the tube 35 together with the grippers in released state returning to normal position.

Simultaneously with the return of the tube 35 and the parts associated therewith the feeder also recedes, the lower member 14 sliding beneath the stack of blanks in the magazine. When the outer feeder member reaches the point at which the bar 20 engages the cams 32, the upper inserting blade rises, opening wide the passage between itself and the rounded end of the lower feeder member. When the inner feeder member again advances carrying with it a new blank, the outer feeder member for the time being remains stationary as has already been described, due to the releasing of the tension of the spring 24, so that by the time the rod 25 is about to take up the driving connection between the two feeder members, the blank has been advanced to a point beneath the inserting blade. When the two feeder members first begin to move together, the bar 20 comes off of the cams 32 bringing the inserting blade down against the blank, firmly holding the blank in position until it is inserted into the tubular fabric and there held by the holding needles 23.

The feeder and the tube 35 are simultaneously actuated by a cam 78' having a groove 79 in which plays a pin 80 carried by a vertically sliding member 81 guided by the fixed parts of the machine. A link 82 is pivoted at about its center to the sliding member 81 from the ends of which link depend connections 83 to the ends of bell cranks 84 and 85 one of which is connected to the lug 15 which moves the feeder, the other being connected to the lug 39 which actuates the tube. The cam 78' is fixed on the general cam shaft 74.

The holding needles 23 are carried by a reciprocation arm 86 actuated by a lever 87 pivoted at an intermediate point to a fixed part of the apparatus and pivotally connected at its opposite end to a link 88 which in turn is connected to a rocking lever 89 having a roller 90 at its free end adapted to drop at the proper time into a depression 91 formed on a cam 92 carried by the general cam shaft. A spring 93 normally urges the mechanism into the holding position of the needles, the needles being inhibited from assuming this position whilesoever the roller 90 is traversing the circular portion of the cam.

Figure 36:
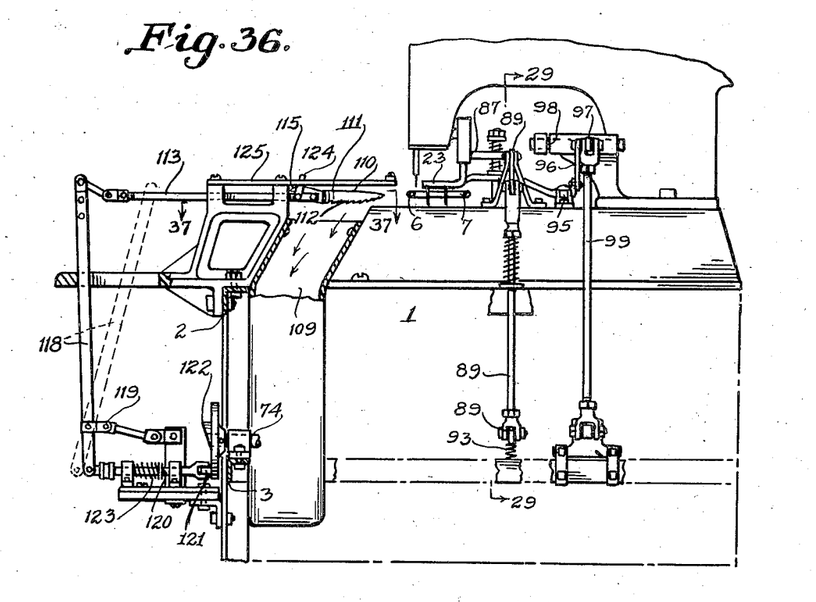
Fig. 36 is a section on line 36—36 of Figure 3.
Figure 37:
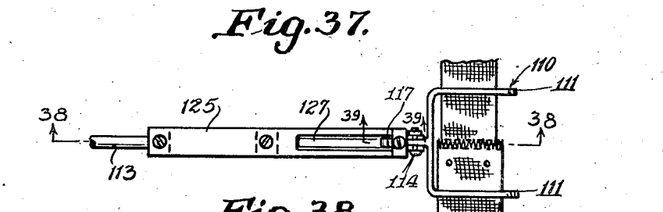
Fig. 37 is a section on line 37—37 of Figure 36.
Figure 38:
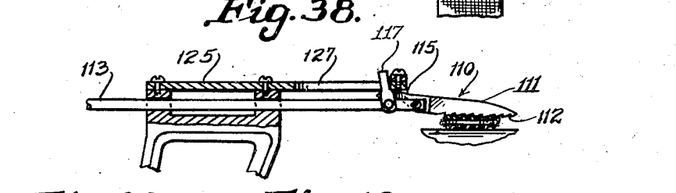
Fig. 38 is a section on line 38—38 of Figure 37.
Figures 39, 40:
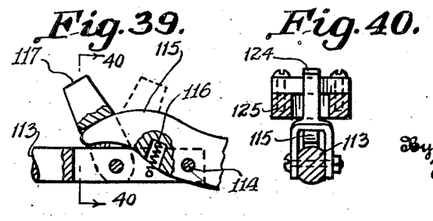
Fig. 39 is a section on line 39—39 of Figure 37.
Fig. 40 is a section on line 40—40 of Figure 39.
Figure 41:
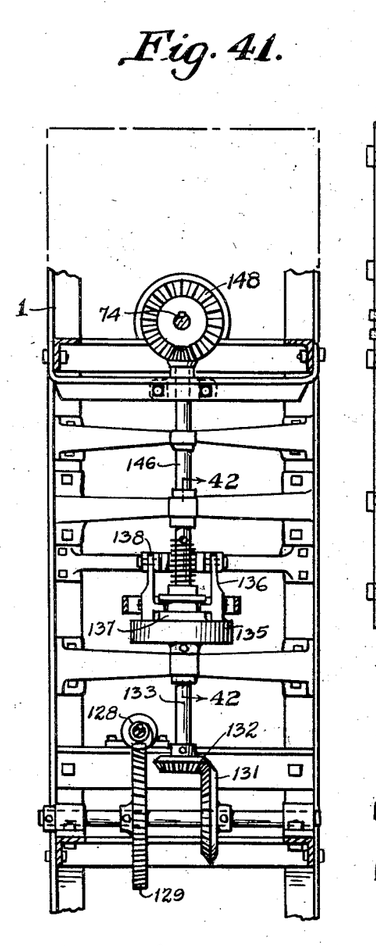
Fig. 41 is a section on line 41—41 of Figure 4.
Figure 42:
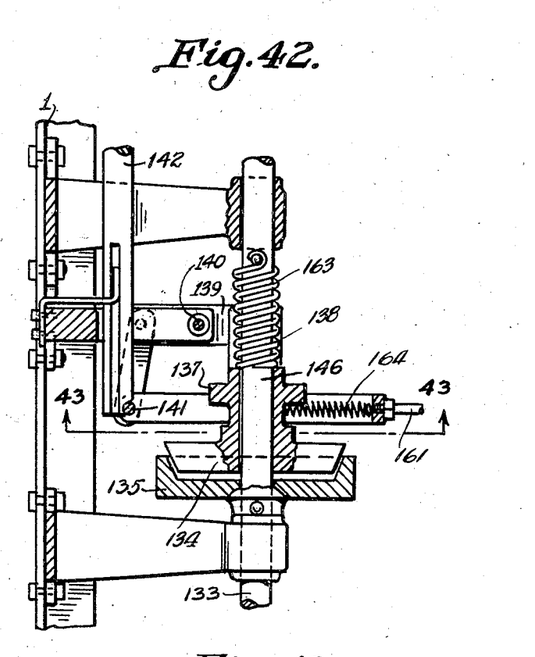
Fig. 42 is a section on line 42—42 of Figure 41.
Figure 43:
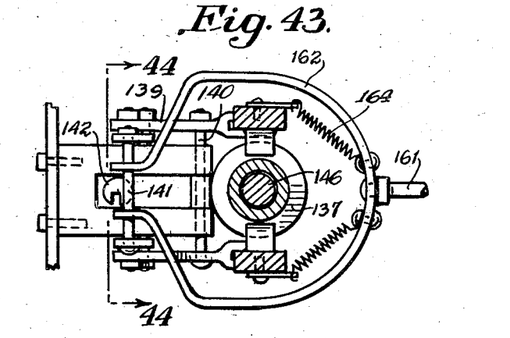
Fig. 43 is a section on line 43—43 of Figure 42.
Figure 44:
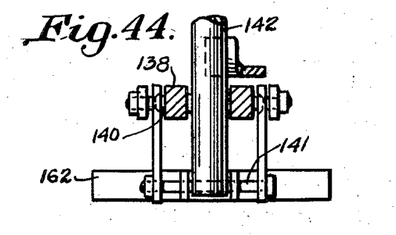
Fig. 44 is a section on line 44—44 of Figure 43.

When the parts are in the position shown in Figure 36 the presser foot comes down firmly upon both pieces of fabric and simultaneously with its assuming a position of engagement with the fabric the holding needles are withdrawn. The presser foot is connected to a plate 94 oscillatable about a pintle 95, the opposite end of said plate being connected by a link 96 to a lever 97 oscillatable about an axis 98, which lever is pivotally connected to a push rod 99, the end of which is operatively positioned with respect to a cam 100 fixed to the general cam shaft.

Figure 1:
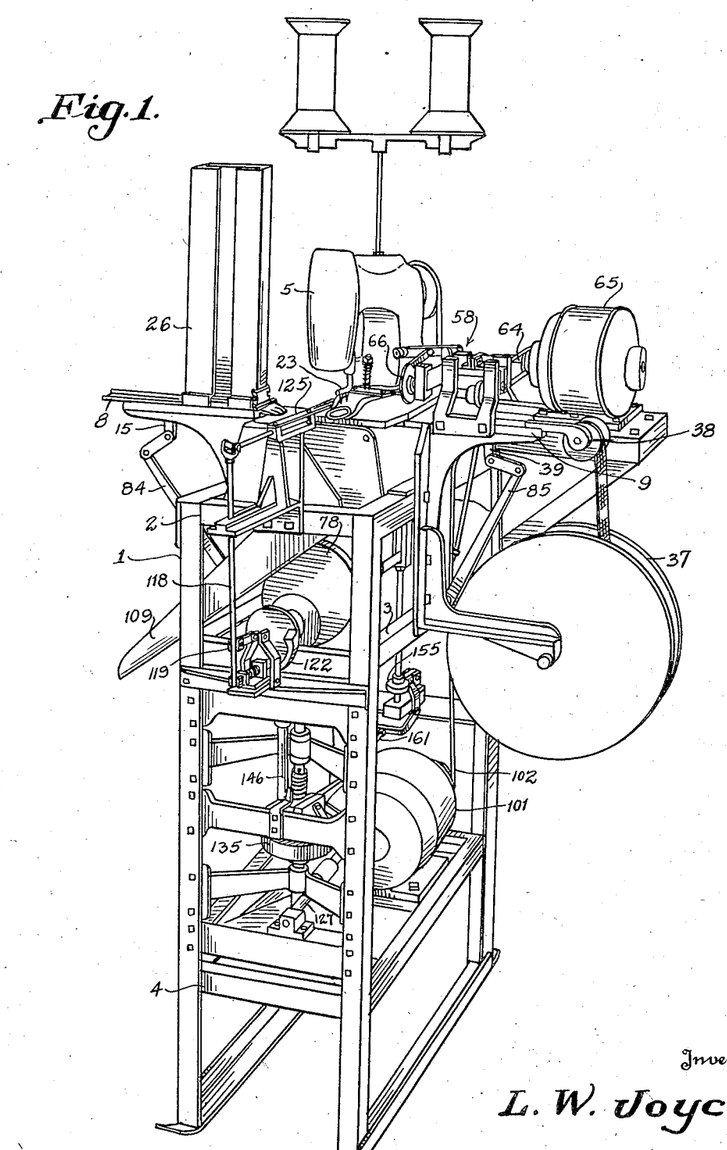
Figure 1 is a perspective view of the assembled mcahine.
Figure 2:
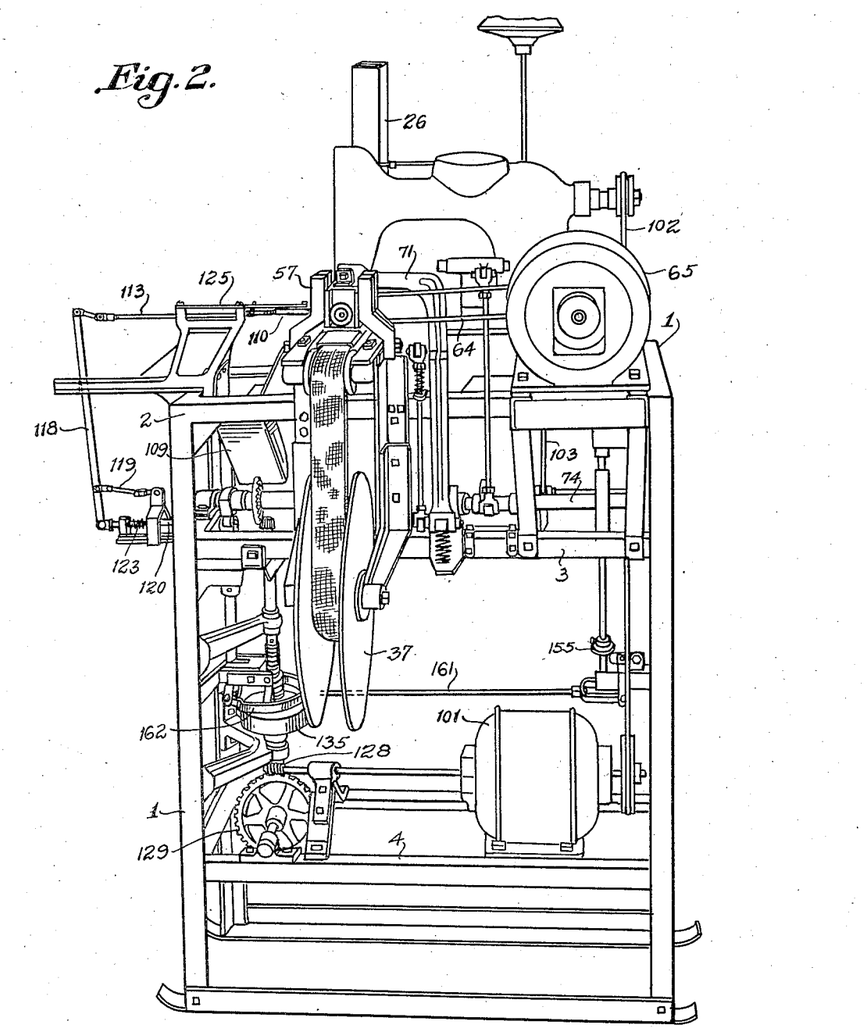
Figure 2 is a perspective view taken from another angle.
Figure 3:
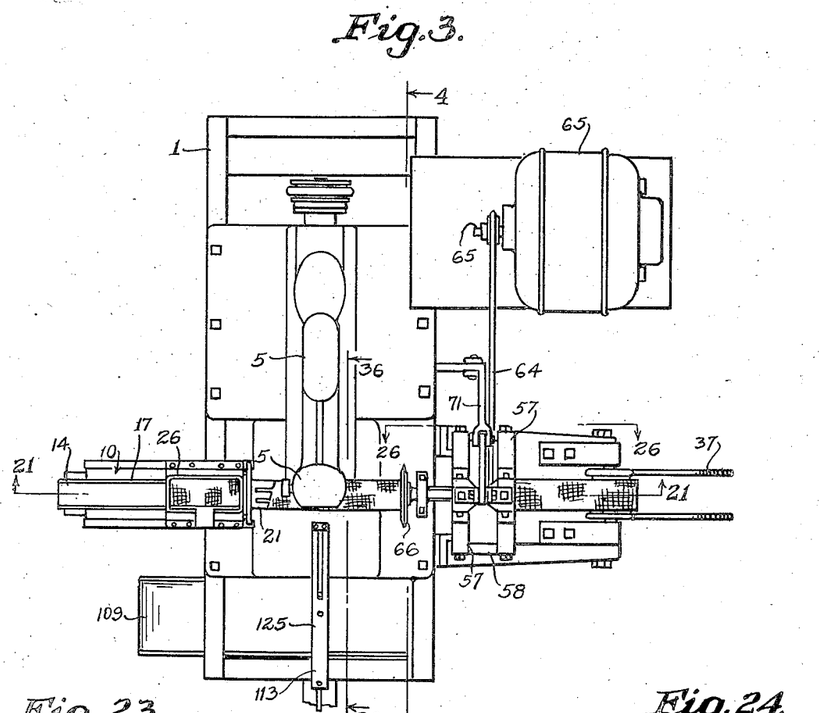
Figure 3 is a plan view of the machine.
Figures 4, 34, 35, 35A:
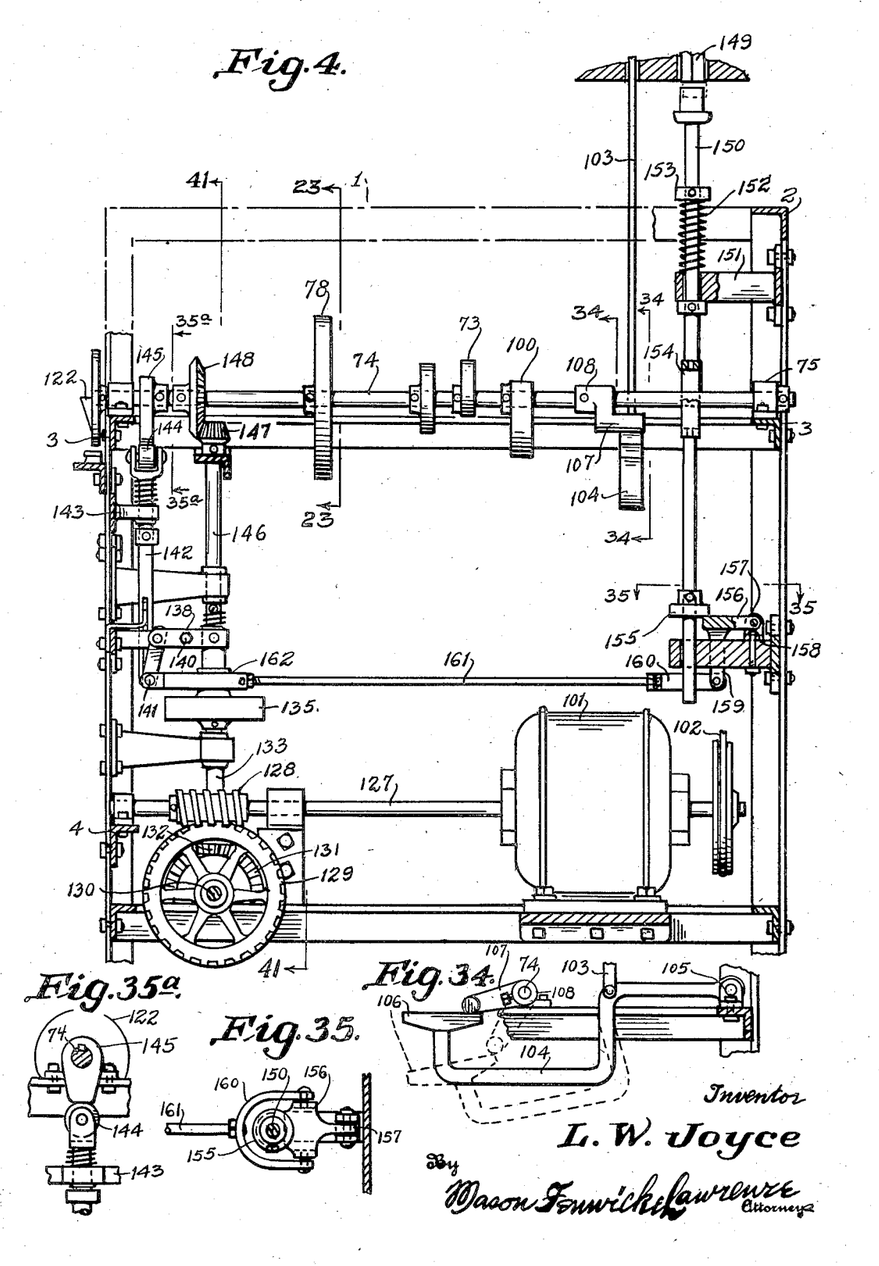
Figure 4 is a section on the line 4—4 of Figure 3.
Fig. 34 is a section on line 34—34 of Figure 4.
Fig. 35 is a section on line 35—35 of Figure 4.
Fig. 35a is a section on line 35a—35a of Figure 4.
Figure 5:
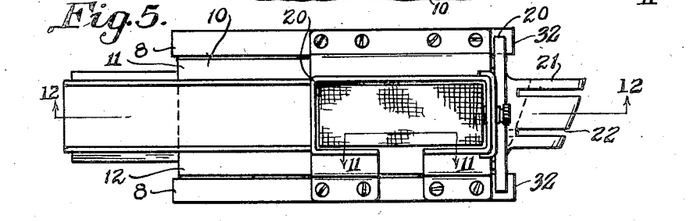
Figure 5 is a plan view of the inner feeding construction.
Figure 6:
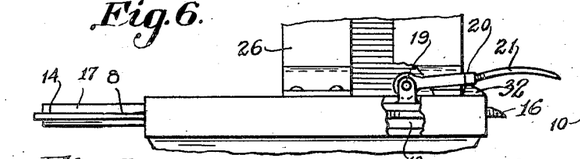
Figure 6 is a fragmentary side elevation of the parts shown in Figure 5.
Figure 7:
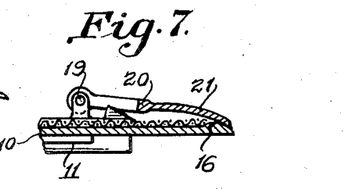
Figure 7 is a section on the line 7—7 of Figure 8.
Figure 8:
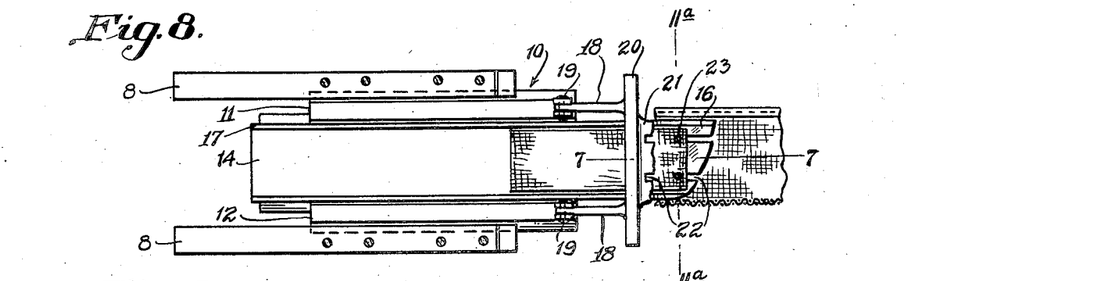
Figure 8 is a plan view of the parts shown in Figure 5 in extended position.
Figures 9, 10, 11, 11A:
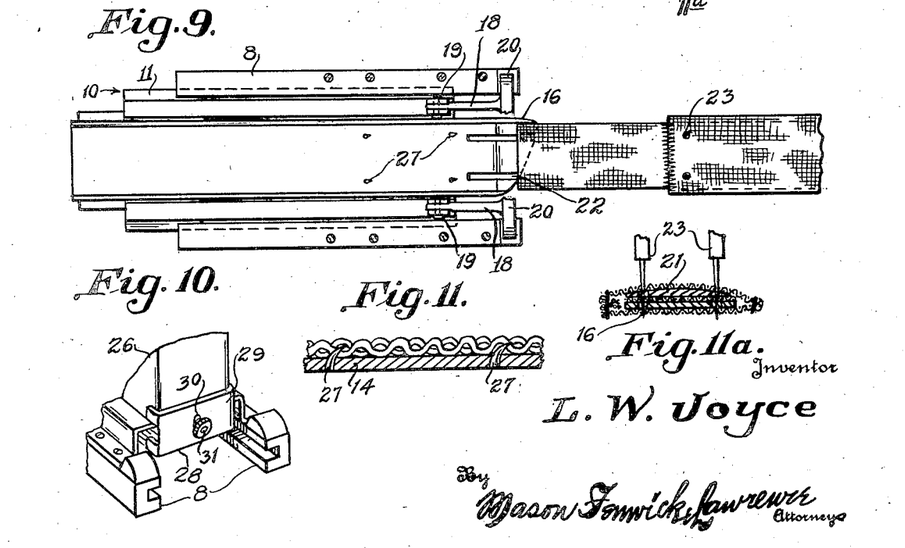
Fig. 9 shows the parts of Fig. 8 in retracted position.
Fig. 10 is a detail perspective of the adjustable door on the magazine.
Fig. 11 is a section on the line 11—11 of Figure 5.
Fig. 11a is a section on the line 11a—11a of Fig. 8.
Figure 12:
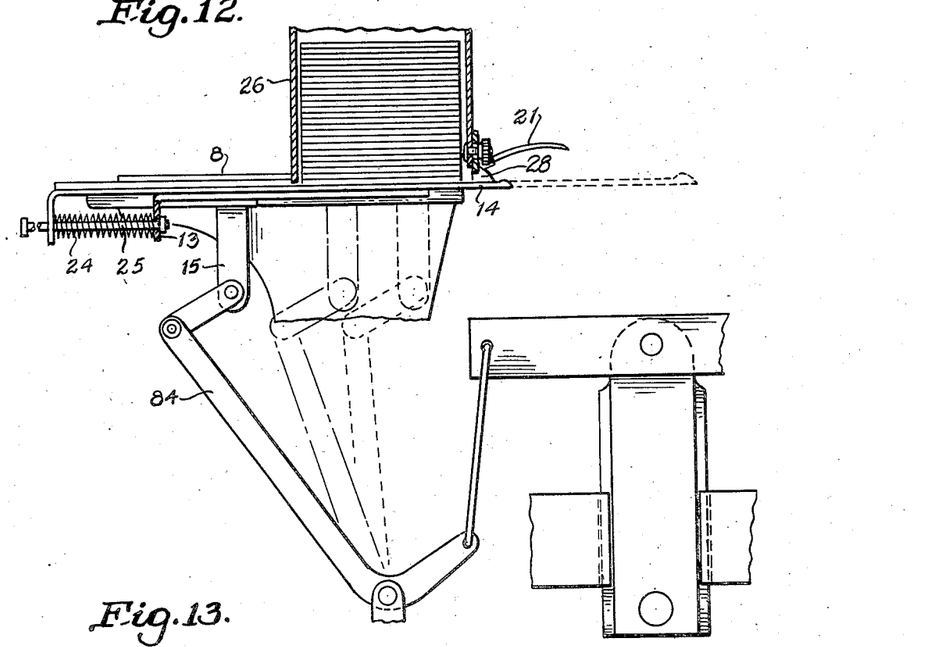
Fig. 12 is a section on line 12—12 of Figure 5.
Figures 13, 14, 15:
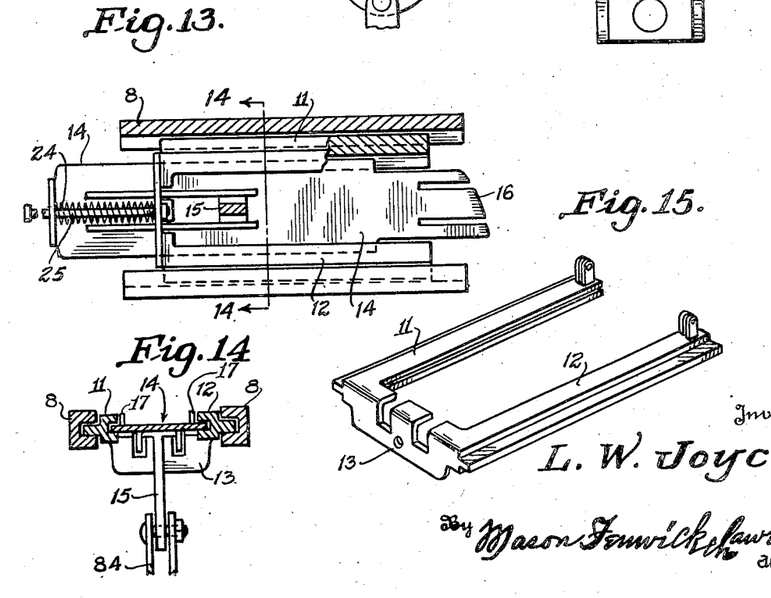
Fig. 13 is a bottom view of the parts in section shown in Figure 12.
Fig. 14 is a section on the line 14—14 of Figure 13.
Fig. 15 is a detail perspective of the outer feeding member.
Figure 16:
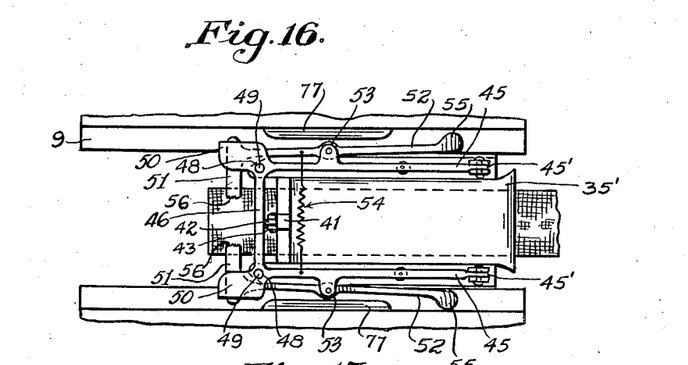
Fig. 16 is a plan of the outer feeding member in retracted position.
Figure 17:
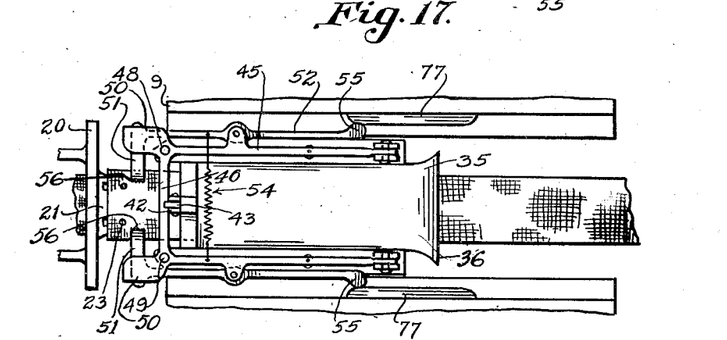
Fig. 17 is a view of the same in extended position.
Figure 18:
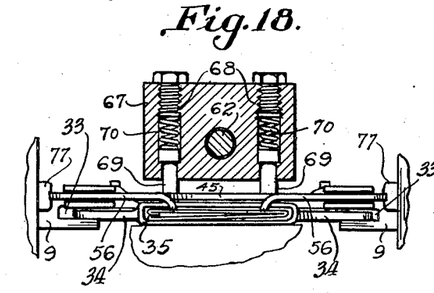
Fig. 18 is a section on line 18—18 of Figure 22.
Figure 19:
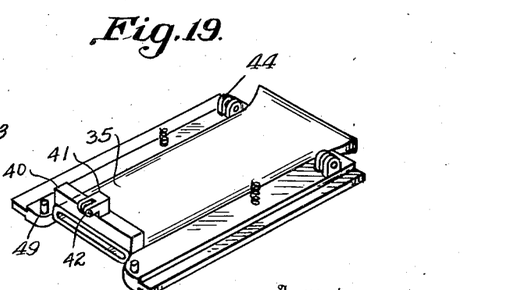
Fig. 19 is a detail perspective of part of the outer feeding member.
Figure 20:
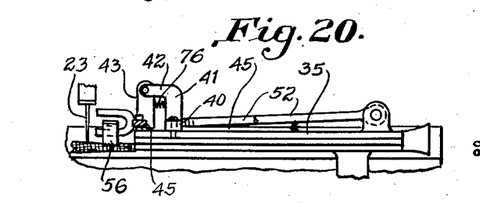
Fig. 20 is a fragmentary side elevation partly in section of the outer feeding member.
Figure 21:
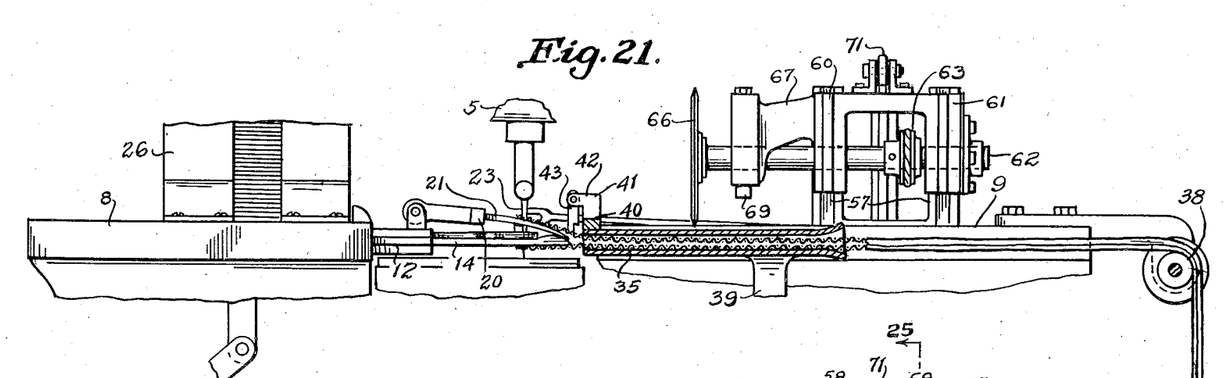
Fig. 21 is a section on line 21—21 of Figure 3.
Figure 22:
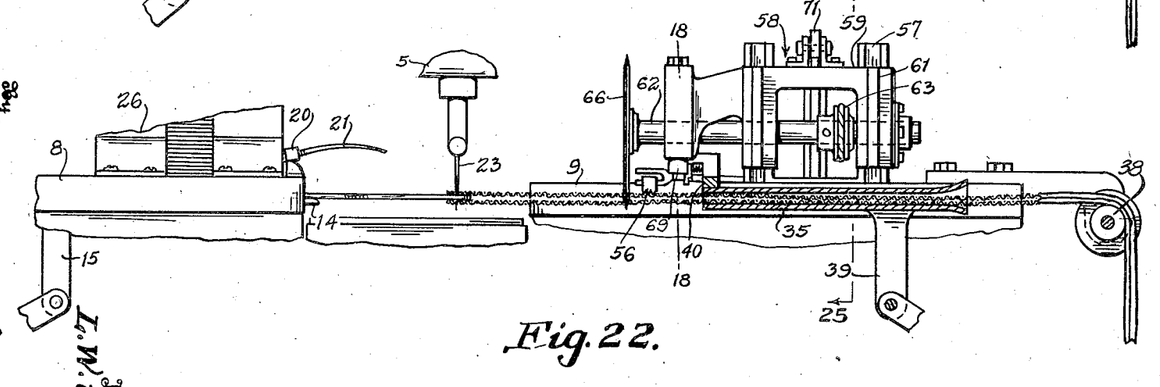
Fig. 22 is a similar view with the parts in another position.
Figure 23:
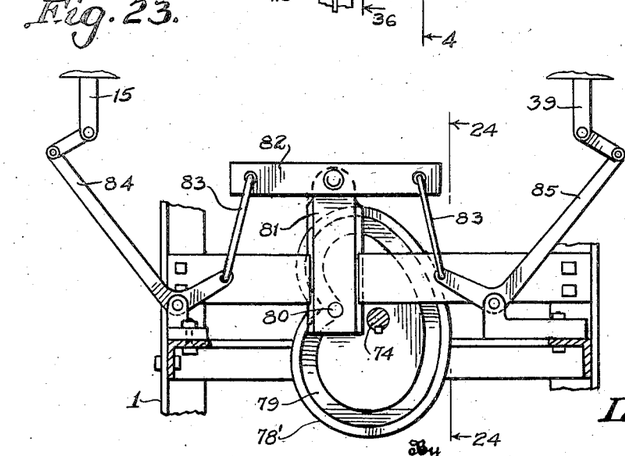
Fig. 23 is a section on line 23—23 of Figure 4.
Figure 24:
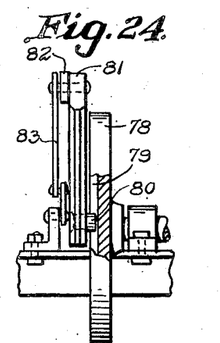
Fig. 24 is a section on line 24—24 of Figure 23.
Figures 25, 26, 27:
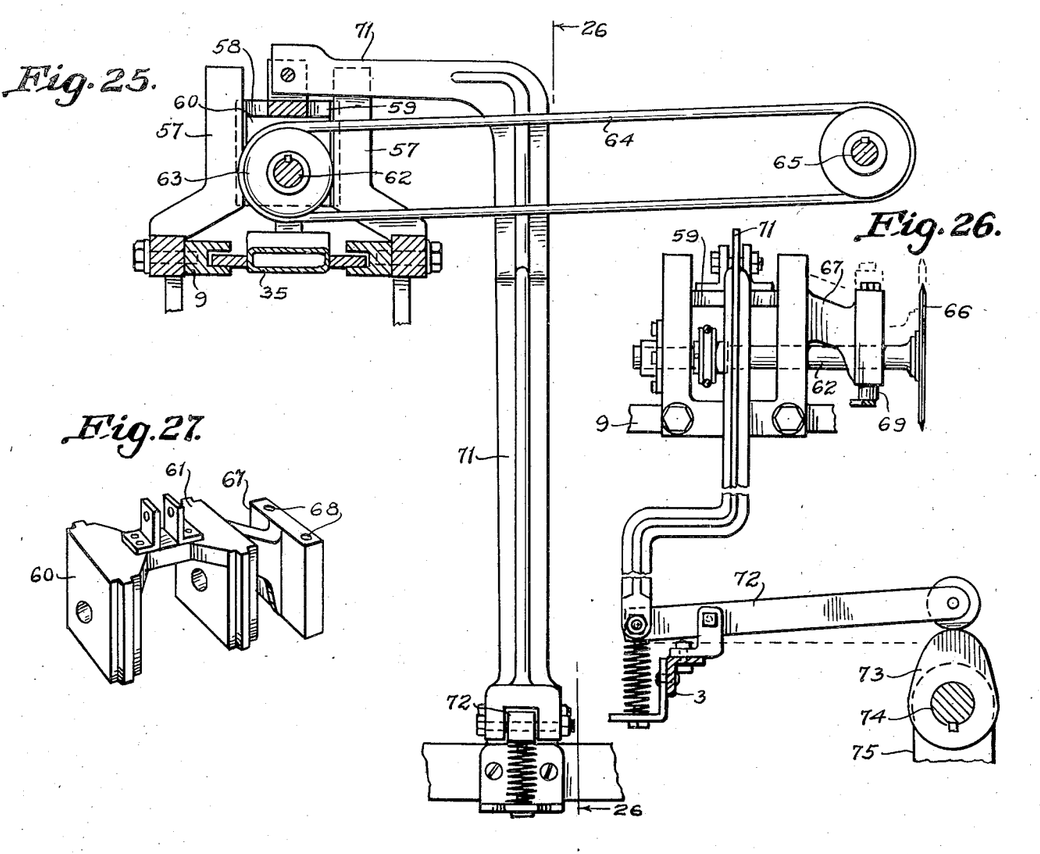
Fig. 25 is a section on line 25—25 of Figure 22.
Fig. 26 is a section on line 26—26 of Figure 25.
Fig. 27 is a detail perspective of the sliding cutter frame.
Figure 28:
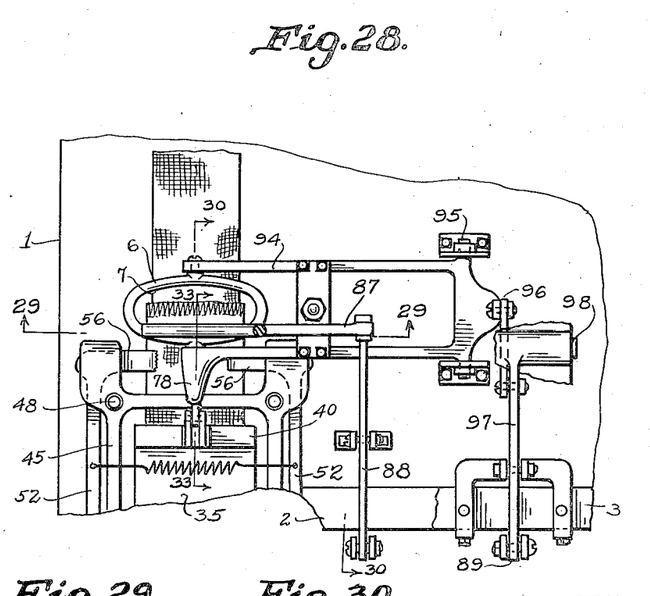
Fig. 28 is a fragmentary plan of the feeding, presser foot and holding needle devices.
Figure 29:
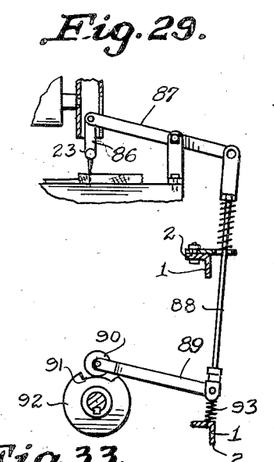
Fig. 29 is a section on line 29—29 of Figure 28.
Figures 30, 31, 32:
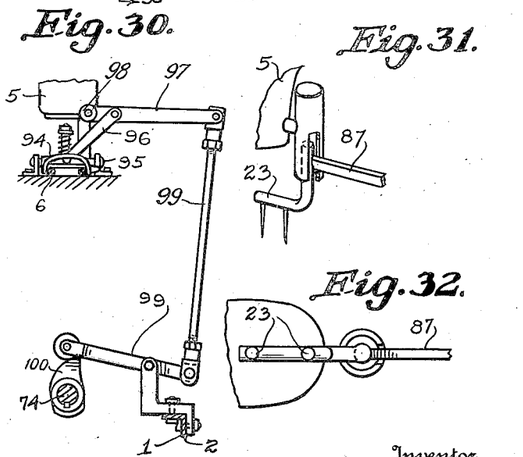
Fig. 30 is a section on line 30—30 of Figure 28.
Fig. 31 is a detail perspective of the holding needle and its support.
Fig. 32 is a bottom view of the parts shown in Fig. 31.
Figure 33:
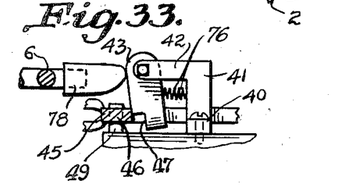
Fig. 33 is a section on line 33—33 of Figure 28.

It will be noted from Figure 2 that the sewing machine is run by a motor 101 through means such as the belt 102. Means is located within the sewing machine head for throwing the machine into operative relation with respect to the motor. This means forms no part of the invention and is therefore, not disclosed. From it depends a rod 103 operatively connected to a lever 104 which is fulcrumed at 105 to a portion of the frame of the intermediate platform 3. Said lever has a portion 106 adapted to be engaged by a crank 107 formed on a hub 108 fixed to the general cam shaft. When the crank engages the portion 106 and depresses the lever 104 it pulls on the rod 103 closing the clutch within the sewing machine head and starting the machine to sewing. The angular position of the crank 107 is so determined that the sewing machine starts operating just as soon as the presser foot is in position and the holding needles have been withdrawn. The machine operates by feeding the unitedly held blanks transversely beneath the sewing needle through the instrumentality of mechanism common to sewing machines and not herein disclosed since it forms no part of the present invention. When the stitching of the blank is completed the machine automatically stops due to mechanism peculiar to the sewing machine and not involved in the present invention, causing the rod 103 to be pulled upwardly. The lever 104 is bent to form an open loop as shown so that when the rod 103 is pulled up the stopping of the sewing machine, the lever 104 will not collide with the crank 107 which is then in a position over the open side of the loop.

A chute 109 is arranged to receive the completed pieces and to discharge them into a suitable receptacle. Said completed pieces are removed from beneath the needle and transferred to the chute by a transverse fork 110, the tines 111 of which are provided with teeth adapted to engage the fabric with sufficient friction to draw the fabric away when said fork is withdrawn. The fork 110 is connected to a sliding rod 113 by a pivoted joint 114, the fork being provided with an integral cam finger 115 extending beyond the pivotal joint and slightly above the rod 113, a spring 116 intervening between said finger and said rod so that when the spring is free to expand, the fork is thrown slightly downwardly with respect to the axis of said rod. Since the rod 113 is arranged just above the plane in which the united fabric blanks lie when beneath the needle, it is obvious that when the spring 116 does expand the fork 110 is thrown down upon the fabric with the force of said spring, but when the spring is compressed the fork is held upwardly just out of contact with said fabric. An oscillating keeper 117 is pivoted on the rod 113, said keeper being bifurcated and so positioned that it can straddle the end of the finger 115. The shape of the finger adjacent the keeper is such that when the keeper is in one position the finger is pressed toward the rod 113 elevating the fork, but that when the keeper is in the other position, the fork is permitted to descend under pressure of the spring 116.

In operation, the rod 113 slides back and forth under the actuation of a lever 118 fulcrumed at an intermediate point 119 and connected at its opposite end to a push rod 120 having a roller 121 urged into contact with the surface of a cam 122 by a spring 123. This cam also is on the general cam shaft 74. The cam 122 is so timed that the fork advances to a position over the fabric blanks just at the time when the sewing ceases. The keeper oscillates within a slot in a fixed plate 125. The length of the slot is so determined that when the fork 110 is over the fabric, the keeper collides with the wall 126 at one end of said slot tripping the finger 115 and causing the fork to descend upon the fabric blanks. When the fork withdraws, it slides the blanks over the surface of the machine and drops them into the chute 109. When the keeper reaches the opposite end of the end wall 127 of the slot, it is reversed, lifting the fork ready for another operation. Simultaneous with the contacting of the fork 110 with the fabric blanks, the presser foot raises, permitting the blanks to be freely withdrawn. The blank is pulled over the edge of the machine base and falls into the chute 109.

The general cam shaft 74 is driven by a motor 101 through a worm 128 engaging a worm wheel 129 on a lay shaft 130, which lay shaft is operably connected through bevelled gears 131 and 132 with a vertical shaft 133 to which is fixed the driving member 135 of a clutch. The driven member 134 of said clutch slides on a shaft 146 carrying at its upper end a bevelled gear 147 meshing with a bevelled gear 148 on the cam shaft and by means of which the cam shaft is rotated.

The driven member of the clutch is brought into and out of clutching relation to the driving member by a yoke 136 embracing a grooved collar 137. The yoke 136 is suspended by links 138 from one end of levers 139 fulcrumed at an intermediate point 140. From the opposite end of the levers 139 is suspended a swinging cross bar 141. A vertically guided push rod 142 has a shoulder at its lower end normally engaging the swinging cross bar. Said push rod passes through a support 143 and the upper part carries a roller 144 contacting with a cam 145 on the general cam shaft.

After the sewing machine has been started by the engagement of the crank 107 with the lever 106, the cam 145 immediately comes to the position in which the push rod 142 is depressed rocking the lever 139 pulling upon the link 138 and lifting the clutch, stopping the general cam shaft and of course, causing immediate cessation of the functions of all the cams located on said cam shaft and which have hereinbefore from time to time, been described. After the sewing machine has sewed its seam forward and backward over the joint between the two blanks, it automatically stops due to mechanism inherent in the machine and not forming part of the present invention. Suffice it to say that when the sewing machine stops, a tappet 149 moves downwardly for a short distance, for example, a half inch. The present invention takes advantage of this movement by providing a train of mechanism by which the clutch controlling the general cam shaft is again thrown into operation. This mechanism comprises a push rod 150 vertically slidable in a supporting lug 151 and having a spring 152 arranged between a fixed collar 153 on said rod and said supporting lug. For convenience, the push rod is shown as being bifurcated and offset at its intermediate portion 154 so as to straddle the general cam shaft 74. The lower end of the push rod has a flanged collar 155 adapted to depress the free end of a lever 156 pivoted at its opposite end 157 to a support 158. Said lever has a pair of downwardly extending arms 159 connected by means of a fork 160 to a pull rod 161 which in turn, is connected to a yoke 162 itself pivotally connected to the swinging cross bar 141. When the sewing machine stops sewing, the tappet comes down depressing the push rod 150, rocking the lever 156 transmitting a pull to the pull rod 161 and drawing the cross bar 141 out from beneath the shoulder of the push rod 142. This releases the lever 139 causing the clutch member 135 to engage the clutch member 134 under the compressive force of the spring 163 which surrounds the shaft 146. Normally, that is to say, before the tappet 149 has descended, the lever 156 is held in raised position by the springs 164.

Thus it will be understood that when the sewing machine begins to sew, just as soon as the general cam shaft has rotated to the point where the cam 145 is in the proper position, the blank feeding mechanism and the related mechanism comes to a standstill and remains inactive while the machine is doing its sewing. Just as soon as the sewing machine has finished sewing the operation of the blank feeding mechanism is again resumed. This is a safety measure through which material will not be fed and wasted, while the sewing machine is operating nor will the operation of the sewing machine interfere with the feeding of the blanks.

Since the operation of the various sets of mechanism by which the purpose of the apparatus is achieved have been described, in connection with the description of said mechanism, it is believed that a resume of the operation of the entire machine is unnecessary.

It is to be understood that the invention includes broadly any means for carrying out the co-ordinated functions exemplified in the present machine and that the details of construction as shown and described are merely illustrative and not to be considered limitative in their bearing upon the invention.

What I claim is:

1. In combination with a sewing machine, synchronized means for delivering a flat fabric blank and a tubular fabric blank from opposite directions to a common sewing point, inserting means for placing said flat blank within said tubular blank at said sewing point, means for holding said blanks at said sewing point while said delivering means retreats, means for starting the sewing machine, and stopping both of said delivering means automatically when the holding means has functioned and the delivering means have retreated, and means operated through the stopping of said sewing machine when the sewing has been completed for starting said delivering means.

2. In combination with a sewing machine, synchronized means for delivering a flat fabric blank and a tubular fabric blank from opposite directions to a common sewing point in telescoped relation at said point, means for holding said blank at said sewing point while said delivering means retreats, means for substituting the presser foot of the sewing machine for said holding means, means for starting the sewing machine and stopping both of said delivering means automatically when the holding means has functioned and the delivering means have retreated, and means operated through the stopping of said sewing machine when the sewing has been completed for raising said presser foot and starting said delivering means.

3. In combination with a sewing machine, synchronized means for delivering a flat fabric blank and a tubular fabric blank from opposite directions to a common sewing point in telescoped relation at said point, one of said delivering means comprising a reciprocatory feeder, a magazine beneath which said feeder moves in a path adapted to engage the lowermost of a stack of fabric blanks and to carry one forward upon each advance stroke, said feeder having upper and lower nose plates at its advance end adapted to introduce themselves and the end of the fabric blank carried by said feeder, into said tubular blank in telescoped relation at said sewing point, means for holding said blanks at said sewing point while said delivery means retreats, means for starting the sewing machine and withdrawing said holding means, the latter having meanwhile been substituted by the presser foot of said sewing machine, and stopping both of said feeding means automatically in retreated position, and means operated through the stopping of said sewing machine when the sewing has been completed for starting said feeding means, the presser foot having meanwhile been raised by said sewing machine.

4. The combination as claimed in claim 3, the delivering means for said tubular blank comprising a flat tube adapted to encompass the end portion of a coil of tubular stock, gripping means carried by said delivery means for the tubular blank engageable with said stock adjacent its free end, and movable transversely in opposite directions for spreading the free end of said stock, to freely admit the upper and lower nose plates of said other delivering means, means for releasing said gripping means when said delivering means has attained its advanced position, and a rotary cutter carried by said delivering means and depressible into severing relation to said stock when said delivering means has retreated, for cutting off that portion of said stock extending from said tube to the plane of said cutter.

5. The combination as claimed in claim 3, the delivering means for said tubular blank comprising a flat tube adapted to encompass the end portion of a coil of tubular stock, gripping means carried by said delivering means for the tubular blank engageable with said stock adjacent its free end and movable transversely in opposite directions for spreading the free end of said stock to freely admit the upper and lower nose plates of said feeder, means carried by the presser foot of said sewing machine for releasing said gripping means when said delivery means has attained its advanced position, and a rotary cutter carried by said delivering means and depressible into severing relation to said stock when said delivering means has retreated, for cutting that portion of said stock extending from said tube to the plane of said cutter.

6. The combination as claimed in claim 3, including a prime mover, a cam shaft having cams so shaped and synchronized as to constitute the actuating elements of motion transmitting members which perform the functions of feeding said fabric and tubular blanks, holding said blanks, starting the sewing machine and withdrawing said holding means, means on said cam shaft for declutching the said shaft from said prime mover as soon as the sewing machine has been started, and means operated through a function of said sewing machine when stopping, for re-engaging said clutch.

7. The combination as claimed in claim 3, the delivering means for said tubular blank comprising a flat tube adapted to encompass the end portion of a coil of tubular stock, gripping means carried by said delivering means for the tubular blank engageable with said stock adjacent its free end, a rotary cutter carried by said delivering means and depressible into severing relation to said stock when said feeding has retreated, for cutting off that portion of said stock extending from said tube to the plane of said cutter, means depressible with said cutter for bringing said gripping means into engagement with said stock, and means engageable by said gripping means as said delivering means advances for moving said gripping means transversely in opposite directions for operating the free end of said stock.

8. In combination with a sewing machine, means for delivering a fabric blank to the sewing point, means for holding said blank at said sewing point while said delivering means retreats, means for starting the sewing machine and stopping the delivering means automatically when the holding means has functioned and the delivering means has retreated, means operated through the stopping of the sewing machine when the sewing has been completed for starting the delivering means, and means for synchronizing the operation of said delivering, holding and starting means, the feeding means comprising a reciprocatory feeder, a magazine beneath which said feeder moves in a path adapted to engage the lowermost of a stack of fabric blanks, means on said feeder positioned to seize the engaged blank in the forward stroke of said feeder, but inert to it on the retreat stroke, said feeder having upper and lower nose plates at its advance end, said plates being slotted and said holding means comprising impaling points entering said slots in the advance position of said shuttle for holding said blank at the sewing point while permitting the feeder to retreat.

9. In combination with a sewing machine of the type which automatically stops when a given length of stitching has been done, means for delivering a fabric blank to a sewing point, means for holding said blank at said point while said delivering means retreats, means for starting the sewing machine and stopping the delivering means automatically when the holding means has functioned and the delivering means has retreated, means operated through the stopping of the sewing machine for again starting the delivering means, and means for synchronizing the operation of said delivering, holding and starting means, the delivering means comprising a reciprocatory feeder, a magazine beneath which said feeder moves in a path adapted to engage the lowermost of a stack of fabric blanks and to carry one forward upon each advance stroke, said feeder having upper and lower nose plates at its advance end arranged to move together during part of the movement of said feeder and movable relatively to movement of another part of said feeder, said nose plates being adapted to rest normally frictionally on the forward end of the blank, and means adjacent said magazine for raising the upper nose plate to permit a fresh blank to be freely advanced beneath said upper nose plate by the initial movement of said feeder.

10. In combination with a sewing machine, means for delivering a fabric blank to the region of sewing, comprising a reciprocatory feeder, a magazine beneath which said feeder moves in a path adapted to engage the lowermost of a stack of fabric blanks, and means on said feeder positioned to seize the engaged blank in the forward stroke of said feeder but inert to it on the retreat stroke, means synchronized with said delivering means for starting the sewing machine and stopping the delivering means automatically when the blank has been delivered to the sewing point and the delivering means has retreated, and means operated through the stopping of the sewing machine when the sewing has been completed for starting the delivering means.

11. The combination as claimed in claim 3, the delivering means for said tubular blank comprising a flat tube adapted to encompass the end portion of a coil of tubular stock, and including means for gripping the said end portion during the delivering movement.

12. The combination as claimed in claim 3, the delivering means for said tubular blank comprising a flat tube adapted to encompass the end portion of a coil of tubular stock, including means for gripping the said end portion during the delivering movement, and a cutter carried by said delivering means for said tubular blank and operable when said delivering means has retreated to cut off that portion of said tubular stock extending from said tube to the plane of the cutter.

13. In combination with a sewing machine, means for delivering a fabric blank to the sewing point, means for holding said blank at the sewing point while said delivering means retreats, means for starting the sewing machine and stopping the delivering means automatically when the holding means has functioned and the delivering means has retreated, means operated through the stopping of the sewing machine when the sewing has been completed for starting the delivering means, means for synchronizing the operation of said delivering, holding and starting means, the delivering means comprising a reciprocatory feeder, a magazine beneath which said feeder moves in a path adapted to engage the lowermost of a stack of fabric blanks and to carry one forward upon each advance stroke, said feeder having upper and lower nose plates at its advance end arranged to move together during part of the movement of said feeder and movable relatively during another part of said feeder movement, said nose plates being adapted normally to rest frictionally on the forward end of the blank, and means adjacent said magazine for raising the upper nose plate to permit a fresh blank to be freely advanced beneath said upper nose plate by the initial movement of said feeder.

LYNDON W. JOYCE.